(12) United States Patent
Chen et al.

(10) Patent No.: US 9,733,655 B2
(45) Date of Patent: Aug. 15, 2017

(54) LOW DROPOUT REGULATORS WITH FAST RESPONSE SPEED FOR MODE SWITCHING

(71) Applicant: VANGUARD INTERNATIONAL SEMICONDUCTOR CORPORATION, Hsinchu (TW)

(72) Inventors: Jui-Lung Chen, Hsinchu (TW); Wei-Ting Chen, Kaohsiung (TW); Tien-Hui Huang, Kaohsiung (TW)

(73) Assignee: Vanguard International Semiconductor Corporation, Hsinchu (TW)

( * ) Notice: Subject to any disclaimer, the term of this patent is extended or adjusted under 35 U.S.C. 154(b) by 0 days.

(21) Appl. No.: 14/990,440

(22) Filed: Jan. 7, 2016

(65) Prior Publication Data

US 2017/0199534 A1 Jul. 13, 2017

(51) Int. Cl.
*G05F 1/56* (2006.01)
*H02M 1/00* (2006.01)

(52) U.S. Cl.
CPC ....... *G05F 1/56* (2013.01); *H02M 2001/0032* (2013.01)

(58) Field of Classification Search
CPC ... G05F 1/56; G05F 1/10; G05F 1/565; G05F 1/46; G05F 1/461; G05F 1/563; G05F 1/59; H02M 2001/0032; H02M 2001/0045
See application file for complete search history.

(56) References Cited

U.S. PATENT DOCUMENTS

| 6,229,289 | B1 * | 5/2001 | Piovaccari | .......... | H02M 3/1588 |
| | | | | | 323/268 |
| 8,710,914 | B1 | 4/2014 | Guhados et al. | | |
| 2003/0211870 | A1 | 11/2003 | Jiguet et al. | | |
| 2006/0056204 | A1 * | 3/2006 | Yang | ................ | H02M 3/33507 |
| | | | | | 363/10 |
| 2006/0087303 | A1 * | 4/2006 | Hartular | ................ | H02M 3/156 |
| | | | | | 323/283 |

(Continued)

FOREIGN PATENT DOCUMENTS

| CN | 101741989 A | 6/2010 |
| CN | 102364407 B | 6/2013 |

(Continued)

*Primary Examiner* — Gustavo Rosario Benitez
(74) *Attorney, Agent, or Firm* — Birch, Stewart, Kolasch & Birch, LLP

(57) ABSTRACT

A low dropout regulator is provided. The low dropout regulator includes an output-stage circuit, a reference-voltage generation circuit, a timing controller, and an active low dropout circuit. When the low dropout regulator is at an operation mode, the output-stage circuit is controlled by a first enable signal to generate first output voltage to an output node of the low dropout regulator. The reference-voltage generation circuit is controlled by a bias voltage to generate a first reference voltage. The timing controller is coupled to the output node and receives the first reference voltage. When the low dropout regulator is in the operation mode, the timing controller programs the first enable signal according to the reference voltage and the voltage at the output node. When the low dropout regulator is in a standby mode, the active low dropout circuit generates a second output voltage to the output node.

12 Claims, 11 Drawing Sheets

(56) References Cited

U.S. PATENT DOCUMENTS

| | | | |
|---|---|---|---|
| 2006/0158165 A1* | 7/2006 | Inn | G05F 1/575 323/280 |
| 2007/0057658 A1* | 3/2007 | Hasegawa | H02M 3/1588 323/282 |
| 2008/0054873 A1* | 3/2008 | Inoue | G05F 1/575 323/351 |
| 2010/0231190 A1* | 9/2010 | Falvey | H02M 3/158 323/284 |
| 2013/0279219 A1 | 10/2013 | Oki | |
| 2015/0160668 A1* | 6/2015 | Pujol | G05F 1/565 323/280 |
| 2015/0229211 A1* | 8/2015 | Walsh | H02M 1/44 323/283 |

FOREIGN PATENT DOCUMENTS

| | | |
|---|---|---|
| CN | 203324738 U | 12/2013 |
| CN | 102707757 B | 7/2014 |

\* cited by examiner

LOW DROPOUT REGULATORS WITH FAST RESPONSE SPEED FOR MODE SWITCHING

BACKGROUND OF THE INVENTION

Field of the Invention

The invention relates to a low dropout regulator which controls power transistors in a digital manner, thereby increasing response speed.

Description of the Related Art

Generally, conventional low dropout regulators have to include resistors and capacitors for frequency compensation. Due to the characteristics of resistors and capacitors, circuits composed of resistors and capacitors have a problem: a slower operation speed. The start-up time required for low dropout regulators to switch from a standby mode to an operation mode is longer. Therefore, it is not appropriate for these low dropout regulators to operate in a standby mode. When these low dropout regulators are used in application devices, the power consumption of the application devices in the standby mode will be increased. In addition, due to the longer start-up time, conventional low dropout regulators cannot be applied in application devices which operate at high frequencies, such as memory devices.

BRIEF SUMMARY OF THE INVENTION

An exemplary embodiment of a low dropout regulator is provided. The low dropout regulator generates a first output voltage at the output node. The low dropout regulator comprises an output-stage circuit, a reference-voltage generation circuit, a timing controller, and active low dropout circuit. When the low dropout regulator operates in an operation mode, the output-stage circuit is controlled by a first enable signal to generate the first output voltage to the output node. The reference-voltage generation circuit is controlled by a bias voltage to generate a first reference voltage. The timing controller is coupled to the output node. The timing controller receives the first reference voltage. When the low dropout regulator operates in the operation mode, the timing controller programs the first enable signal according to a voltage at the output voltage and the first reference voltage. When the low dropout regulator operates in a standby mode, the active low dropout circuit generates a second output voltage to the output node.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
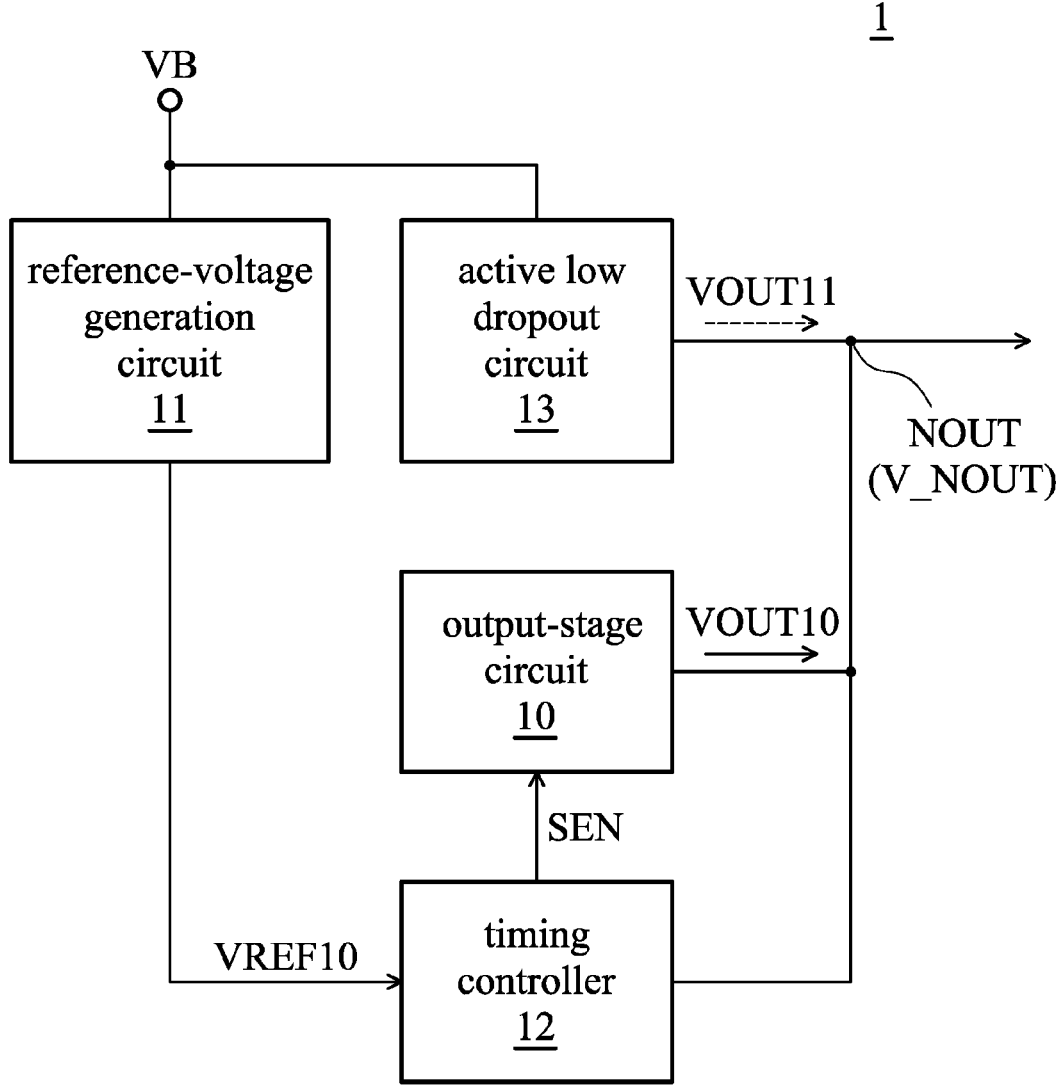
FIG. 1 shows an exemplary embodiment of a low dropout regulator.

FIG. 1 shows an exemplary embodiment of a low dropout regulator. Referring to FIG. 1, the low dropout regulator 1 comprises an output-stage circuit 10, a reference-voltage generation circuit 11, a timing controller 12, and an active low dropout circuit 13. All of the output-stage circuit 10, the timing controller 12, and the active low dropout circuit 13 are coupled to an output node NOUT. The low dropout regulator 1 may operate in an operation mode or a standby mode. In the operation mode and the standby mode, the low dropout regulator 1 works in different ways. The details will be described in the following paragraphs. In the operation mode, the output-stage circuit 10 is controlled by an enable signal SEN to generate an output voltage VOUT10 to the output node NOUT. The reference-voltage generation circuit 11 is controlled by a bias voltage VB to generate a reference voltage REF10 to the timing controller 12. It should be appreciated that the load of the low dropout regulator 1 may draw a large current from the output node NOUT, so that the voltage at the output node NOUT is lowered suddenly (to be lower than the voltage VOUT10 provided by the output-stage circuit 10). The timing controller 12 detects the voltage at the output node NOUT and compares the detected voltage with the reference voltage VREF10 to generate the enable signal SEN having a plurality of pulses. In the embodiment, the enable signal SEN is a digital signal. A pulse occurring on the enable signal SEN represents logic "1"; no pulse on the enable signal SEN represents logic "0". The enable signal SEN is programmed by the timing controller 12 according to the comparison result of the voltage at the output node NOUT and the reference voltage VREF10. In detail, the timing controller 12 programs the enable signal SEN, thereby modulating the pulse width of the enable signal SEN, that is, thereby modulating the length of the time period for which one pulse of the enable signal SEN occurs.

When the low dropout regulator 1 operates in the standby mode, the enable signal SEN is inactive: that is, the enable signal SEN does not carry any pulse. Thus, the output-stage circuit 10 is not inactivated. In other words, the output-stage circuit 10 does not generate any output voltage VOUT to the output node NOUT. At this time, the active low dropout circuit 13 provides an output voltage VOUT11 to the node NOUT. The output voltage VOUT11 is different from the output voltage VOUT10. In the embodiment, the output voltage VOUT11 provides the power that is required just for devices coupled to the low dropout regulator 1 in the standby mode.

At described above, the enable signal SEN used for controlling the output-stage circuit 10 is a digital signal. Thus, when the low dropout regulator 1 is in the operation mode, the output-stage circuit 10 is capable of providing the output voltage VOUT10 quickly according to the pulses of the enable signal SEN, so that the low dropout regulator 1 has a faster response speed, which makes the voltage at the output node NOUT rises quickly to the output voltage VOUT10. Accordingly, the low dropout regulator 1 is capable of operating in the standby mode. Due to the faster response speed, the start-up time required for the low dropout regulator 1 switching from the standby mode to the operation mode is shorter. Moreover, during the standby mode, the voltage at the output node NOUT is provided by the active low dropout circuit 13 which does not need to be controlled by the enable signal SEN. Thus, less power is consumed by the low dropout regulator 1 in the standby mode.

Figure 2:
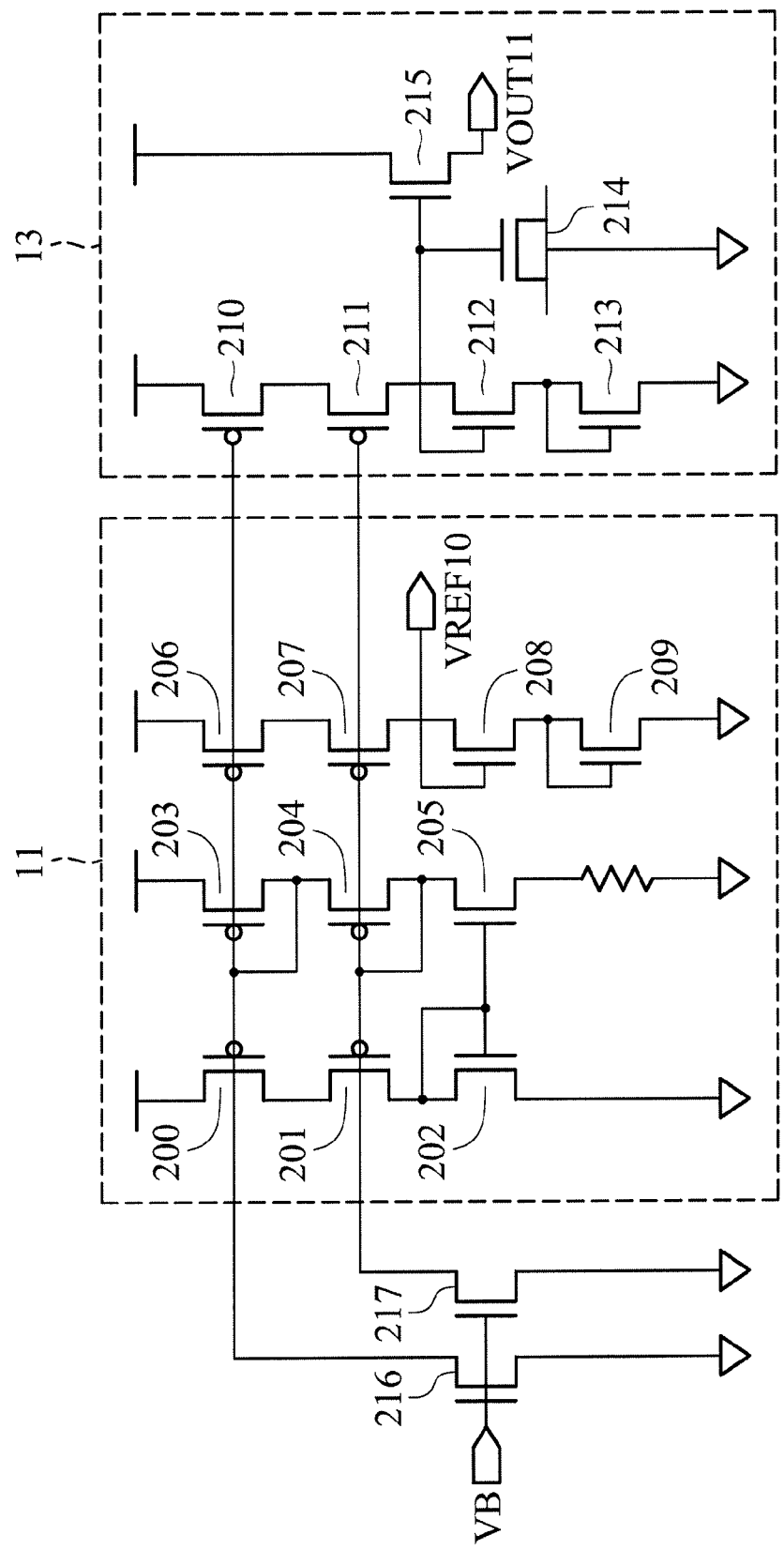
FIG. 2 shows an exemplary embodiment of a reference-voltage generation circuit and an active low dropout circuit.

FIG. 2 shows an exemplary embodiment of the reference-voltage generation circuit 11 and the active low dropout circuit 13. In the embodiment, the reference-voltage generation circuit 11 is a sub-threshold reference-voltage generator. According to an example, the reference-voltage generation circuit 11 is composed of transistors 200-209, and the active low dropout circuit 13 is composed of transistors 210-215. The reference-voltage generation circuit 11 is controlled by the bias voltage VB through transistors 216 and 217 to generate the reference voltage VREF10, such as 1.8V. The active low dropout circuit 13 is also controlled by the bias voltage VB through transistors 216 and 217. When the low dropout regulator 1 operates in the standby mode, the active low dropout circuit 13 is controlled by the bias voltage VB and provides the output voltage VOUT11 to the output node NOUT according to the received supply voltage. In the embodiment of FIG. 2, the structure of each of the reference-voltage generation circuit 11 and the active low dropout circuit 13 is given as an example without any limitation. Without departing from the operation characteristics of the reference-voltage generation circuit 11 and the active low dropout circuit 13 described herein, the reference-voltage generation circuit 11 and the active low dropout circuit 13 can have different structures according to the system requirements and designs.

Figure 3:
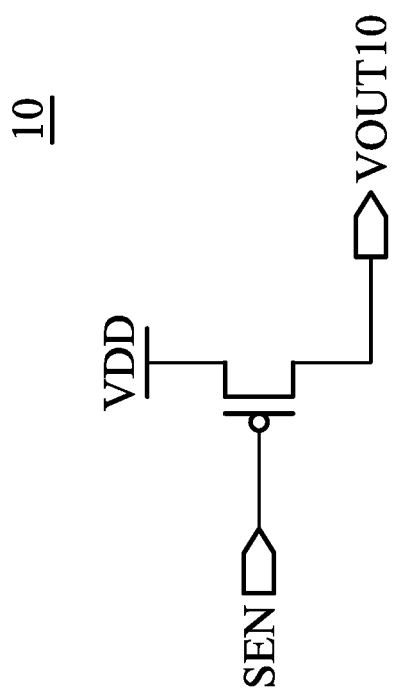
FIG. 3 shows one exemplary embodiment of an output-stage.

FIG. 3 shows an exemplarity embodiment of the output-stage circuit 10. As shown in FIG. 3, the output-stage circuit 10 comprises a transistor 300. In the embodiment, the transistor 300 is implemented by a P-type metal oxide semiconductor (PMOS) transistor. The gate (control terminal) of the PMOS transistor 300 receives the enable signal SEN, the source (input terminal) thereof receives an operation voltage VDD, and the drain (output terminal) thereof is coupled to the output node NOUT. The operation of the PMOS transistor 300 will be described later by referring to FIGS. 3-5.

Figure 4:
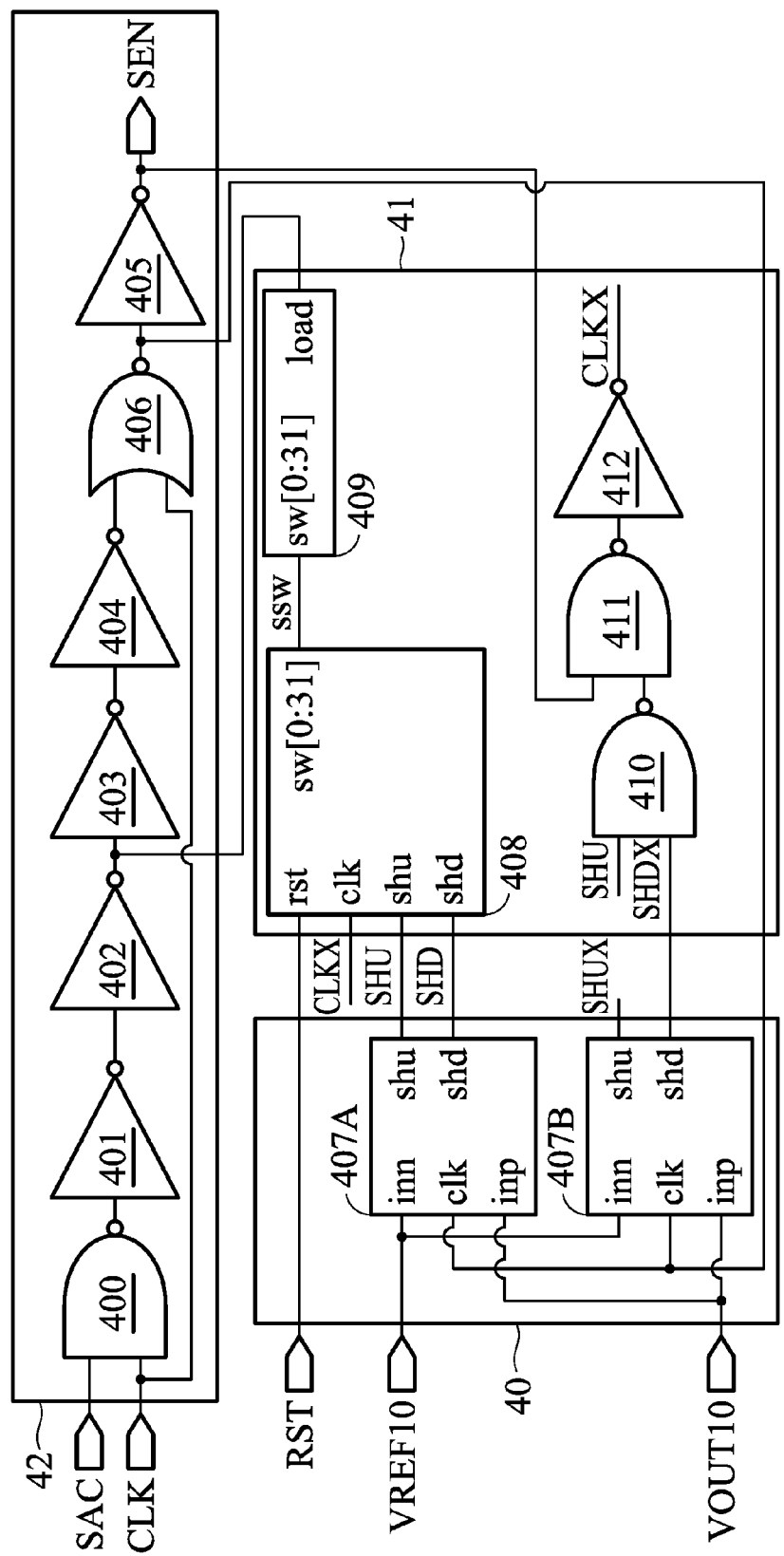
FIG. 4 shows one exemplary embodiment of a timing controller.
Figure 5:
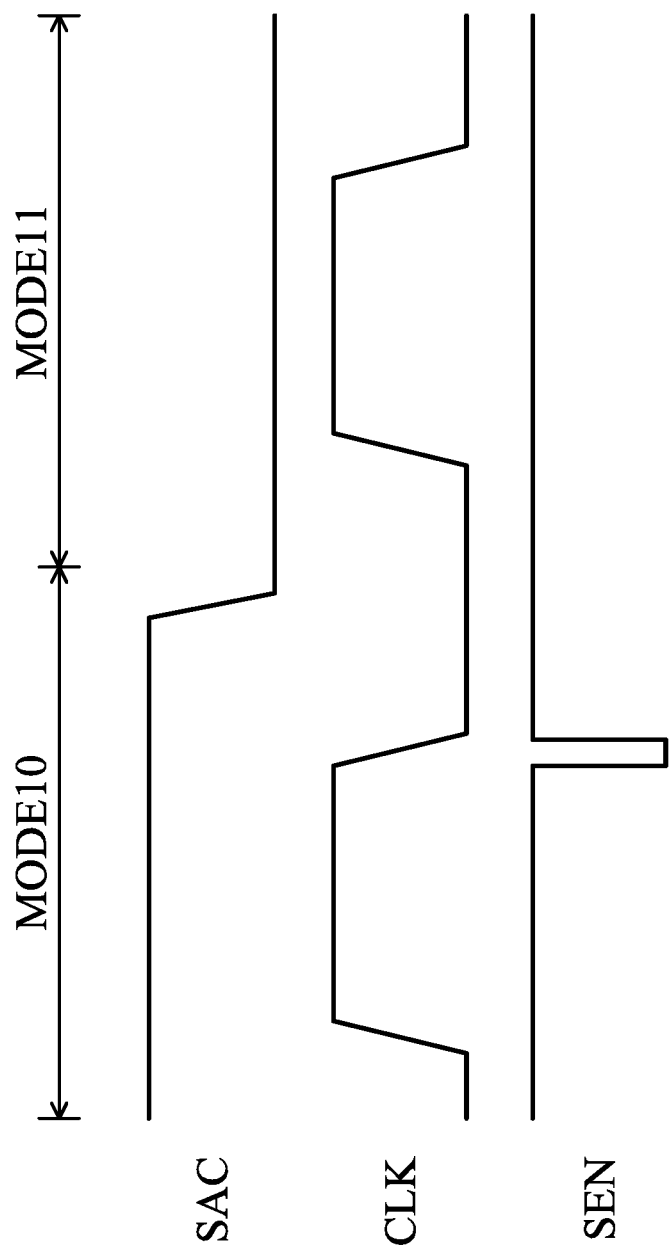
FIG. 5 shows a timing chart of an enable signal in an operation mode and in a standby mode according to an exemplary embodiment.

FIG. 4 shows an exemplary embodiment of the timing controller 12. Referring to FIG. 4, the timing controller 12 comprises a comparison circuit 40, a programmable timing generator 41, and a pulse generator 42. The pulse generator 42 receives a clock signal CLK and a start-up signal SAC. The clock signal CLK is a base clock of the low dropout regulator 1, and the start-up signal SAC indicates which mode the low dropout regulator 1 is in. When the low dropout regulator 1 is in the operation mode MODE10, the start-up signal SAC is enabled (that is, the start-up signal SAC has a high level, as shown in FIG. 5). When the low dropout regulator 1 is in the standby mode MODE11, the start-up signal SAC is not enabled (that is, the start-up signal SAC has a low level, as shown in FIG. 5). The clock generator 41 comprises a plurality of logic units, such as a NAND gate 400, inverters 401-105, and a NOR gate 406. In the operation mode, these logic units operates together to generate the enable signal SEN according to the clock signal CLK and the start-up signal SAC. The pulse generator 42 further modules the pulse width of the enable signal SEN according to a charge time. The charge time is determined by the comparison circuit 40 and the programmable timing generator 41 operating according to the reference voltage VREF10 and the detected voltage at the output node NOUT. Referring to FIG. 5, the pulse of the enable signal SEN occurs at the falling edge of the clock signal CLK.

Figure 6:
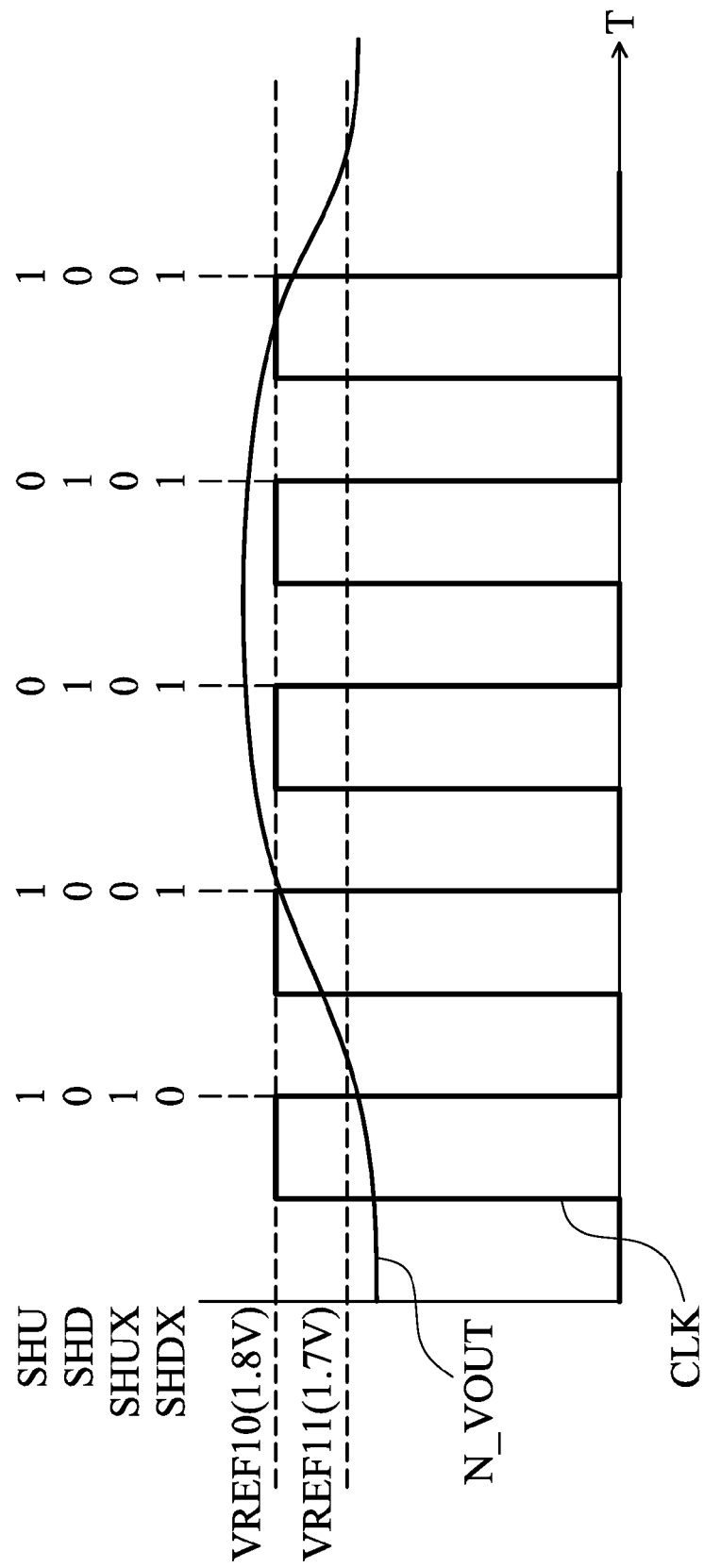
FIG. 6 shows a schematic diagram illustrating the relationship between control signals and voltage at an output node according to one exemplary embodiment.

Referring to FIG. 4, the comparison circuit 40 comprises comparators 407A and 407B. In the operation mode, both of the comparators 407A and 407B receive the reference voltage VREF10, the voltage at the output voltage NOUT, and the output of the NOR gate 406. In the embodiment, the comparators 407A and 407B have different channel width ratios. For example, the channel width ratio of the comparator 407A is 1:1, while the channel width ratio of the comparator 407B is 1.1:1. The comparator 407A compares the reference voltage VREF10 (such as 1.8V) with the voltage at the output node NOUT when one rising edge of the clock signal CLK occurs. The comparator 407A keeps the comparison result until one falling edge of the clock signal CLK occurs to generate control signals SHU and SHD. When the voltage at the output node NOUT is less than the reference voltage VREF10, the control signal SHU has a high level (that is logic"1") while the control signal SHD has a low level (that is logic "0"). When the voltage at the output node NOUT is greater than the reference voltage VREF10, the control signal SHU has a low level (that is logic"0") while the control signal SHD has a high level (that is logic "1"), as shown in FIG. 6. As described above, the channel width ratio of the comparator 407A is 1.1:1. Thus, the comparator 407B transfers the reference voltage VREF10 to the reference voltage VREF11 based on its channel width ratio, such as 1.7V (shown in FIG. 6). The comparator 407B compares the reference voltage VREF11 (such as 1.7V) with the voltage at the output node NOUT when one rising edge of the clock signal CLK occurs. The comparator 407B keeps the comparison result until one falling edge of the clock signal CLK occurs to generate control signals SHUX and SHDX. When the voltage at the output node NOUT is less than the reference voltage VREF11, the control signal SHD has a low level (that is logic "0"). When the voltage at the output node NOUT is greater than the reference voltage VREF11, the control signal SHD has a high level (that is logic "1"), as shown in FIG. 6.

Referring to FIG. 4, the programmable timing generator 41 comprises a shift register 408, an adjustable capacitor array 409, NAND gates 410 and 411, and an inverter 412. In the operation mode, the shift register 408 uses the clock signal CLK as its operation clock and generates a switch signal SSW according to the control signal SHU and SHD. Referring to FIG. 6, when the control signal SHU has a high level (logic "1"), the level register 408 performs a count-up operation to increase the value of the switch signal SSW. When the control signal SHD has a high level (logic "1"), the level register 408 performs a count-down operation to decrease the value of the switch signal SSW. The adjustable capacitor array 409 comprises a plurality of capacitors which can be selected individually. The adjustable capacitor array 409 receives the switch signal SSW and selects the capacitors to be coupled to the input terminal of the inverter 403 in the pulse generator 42 according to the switch signal SSW. In other words, the adjustable capacitor array 409 changes the number of capacitors which are coupled to the input terminal of the inverter 403 according to the switch signal SSW, thereby modulating the charge time of the pulse generator 42 and further modulating the pulse width of the enable signal SEN in the next cycle. Thus, the switch signal SSW is capable of indicating the state of the voltage at the output node NOUT in the current cycle for modulating the pulse width of the enable signal SEN in the next cycle in response to the state described above.

The two input terminals of the NAND gate 410 receive the control signals SHU and SHDX respectively. One input terminal of the NAND 411 is coupled to the output terminal of the NAND gate 410, and the other input terminal thereof receives the enable signal SEN. The input terminal of the inverter 412 is coupled to the output terminal of the NAND gate 411 and the output terminal thereof generates a clock signal CLKX to the shift register 408. Through the operations of the NAND gates 410 and 411 and the inverter 412, the shift register 408 is capable of outputting the switch signal SSW to adjust the charge time of the pulse generator 42 when any pulse of the enable signal SEN does not occur yet, thereby modulating the pulse width of the enable signal SEN in the next cycle.

As described above, referring to FIG. 6, in the operation mode, through the operations of the comparators 407A and 704B, the comparators 407A and 407B defines a lock range, that is the range between the reference voltages VREF11 and VREF10 (1.7V-1.8V). When the voltage N_VOUT at the output node NOUT is not in the lock range and is less than 1.7V, the control signals SHU, SHD, and SHDX are logic "1", "0", and "0" respectively. At this time, the programmable timing controller 41 shortens the charge time of the pulse generator 42 by changing the switch signal SSW, the pulse width of the enable signal SEN in the next cycle is increased. When the voltage N_VOUT at the output node NOUT is not in the lock range and is greater than 1.8V, the control signals SHU, SHD, and SHDX are logic "0", "1", and "1" respectively. At this time, the programmable timing controller 41 lengthens the charge time of the pulse generator 42 by changing the switch signal SSW, so that the pulse width of the enable signal SEN in the next cycle is decreased. When the voltage N_VOUT at the output node NOUT is in the lock range, the control signals SHU, SHD, and SHDX are logic "1", "0", and "1" respectively. At this time, the shift register 408 of the programmable timing controller 41 performs a lock operation, so that the switch signal SSW is not changed, thereby maintaining the number of capacitors in the adjustable capacitor array 409 which are coupled to the inverter 403. In other words, the programmable timing controller 41 does not change the charge time of the pulse generator 42 to maintain the pulse width of the enable signal SEN. That is, the pulse width of the enable signal SEN in the next cycle is the same as that in the pulse width of the enable signal SEN of the current cycle.

Figure 7A:
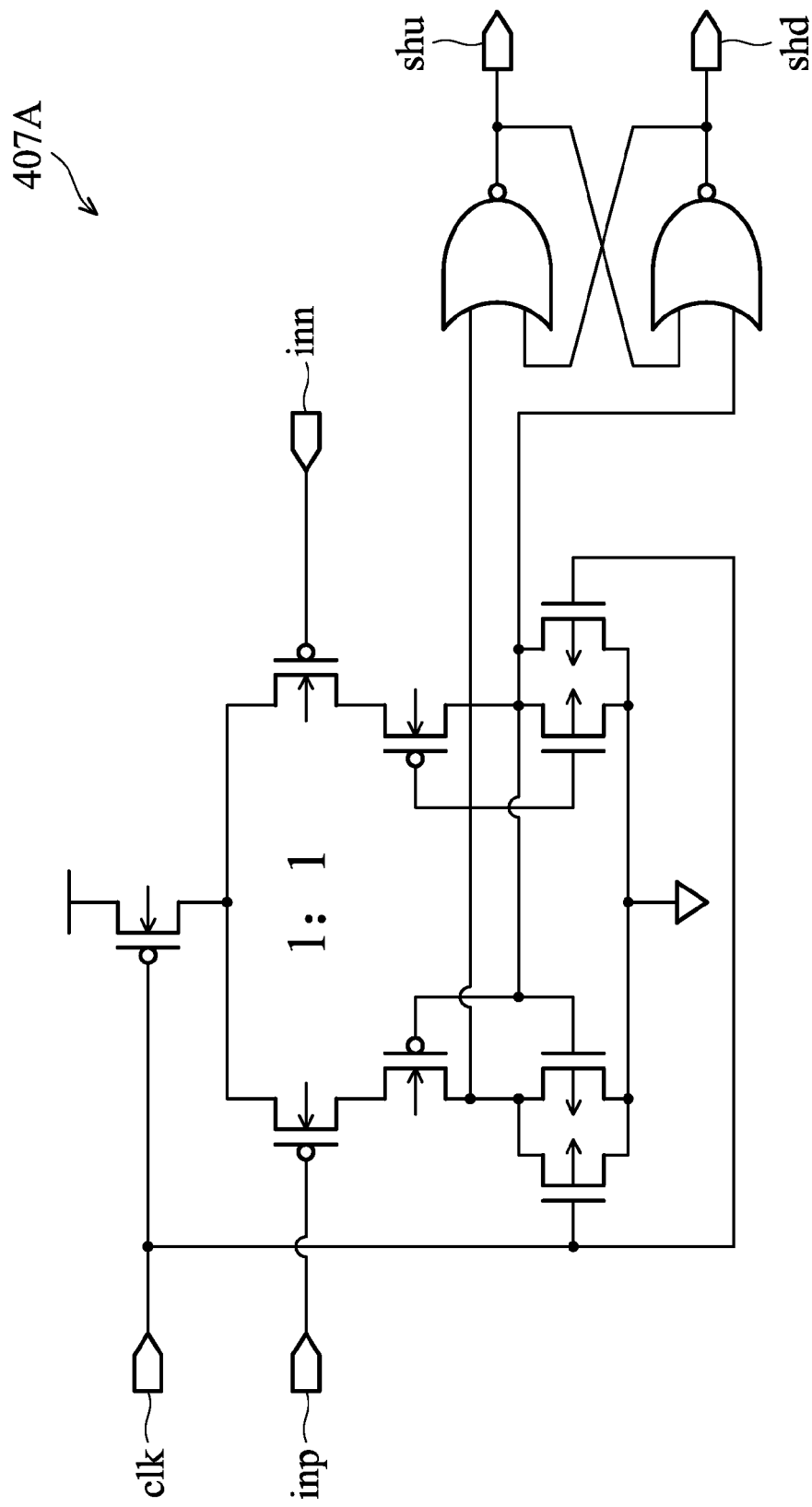
FIGS. 7A and 7B show an exemplary embodiment of comparators.
Figure 7B:
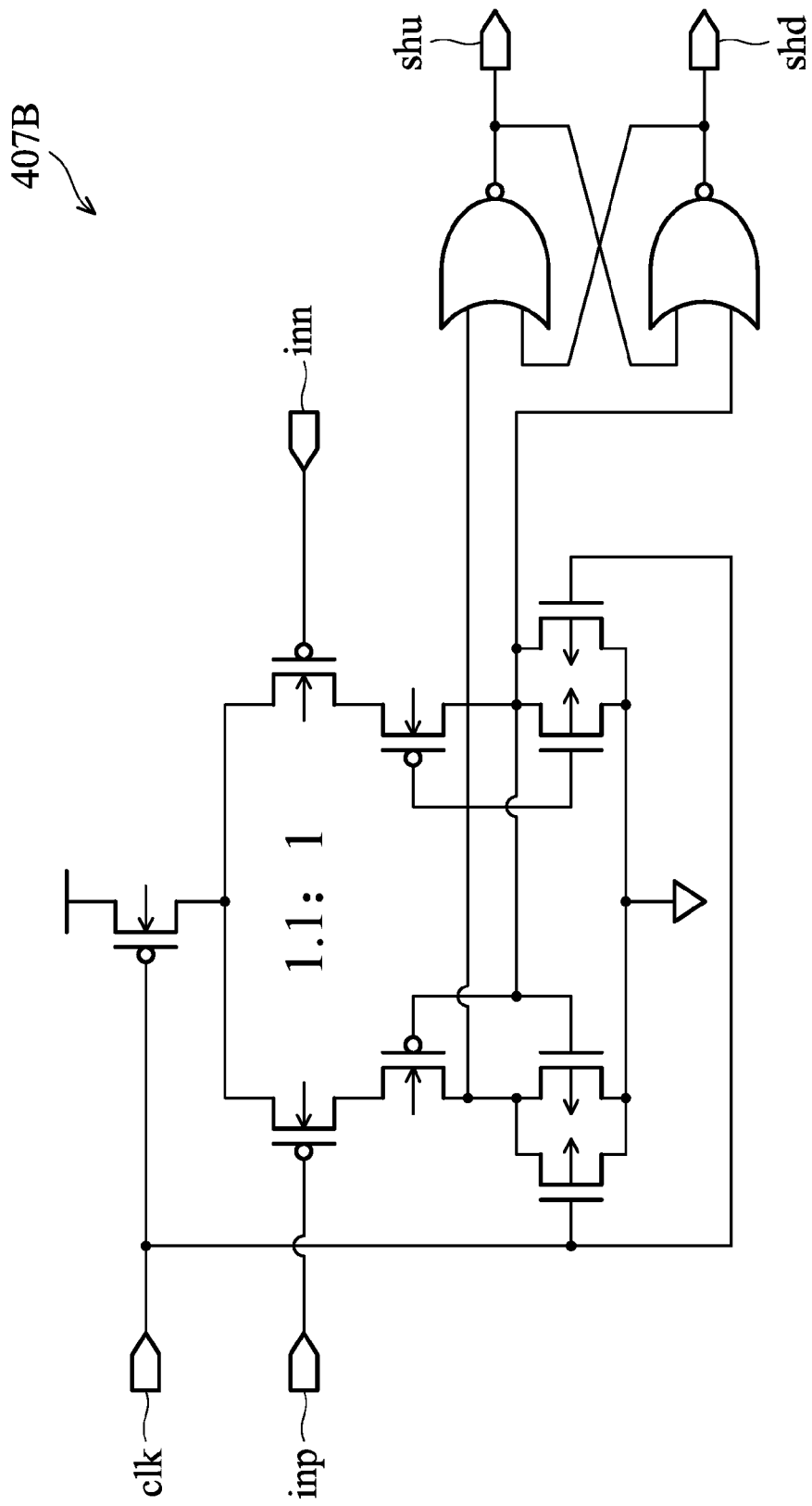

FIG. 7 shows an exemplary embodiment of the comparators 407A and 407B. In the embodiment of FIG. 7, the structure of each of the comparators 407A and 407B is given as an example without any limitation. Without departing from the operation characteristics of the comparators 407A and 407B described herein, the comparators 407A and 407B can have different structures according to the system requirements and designs.

Figure 8:
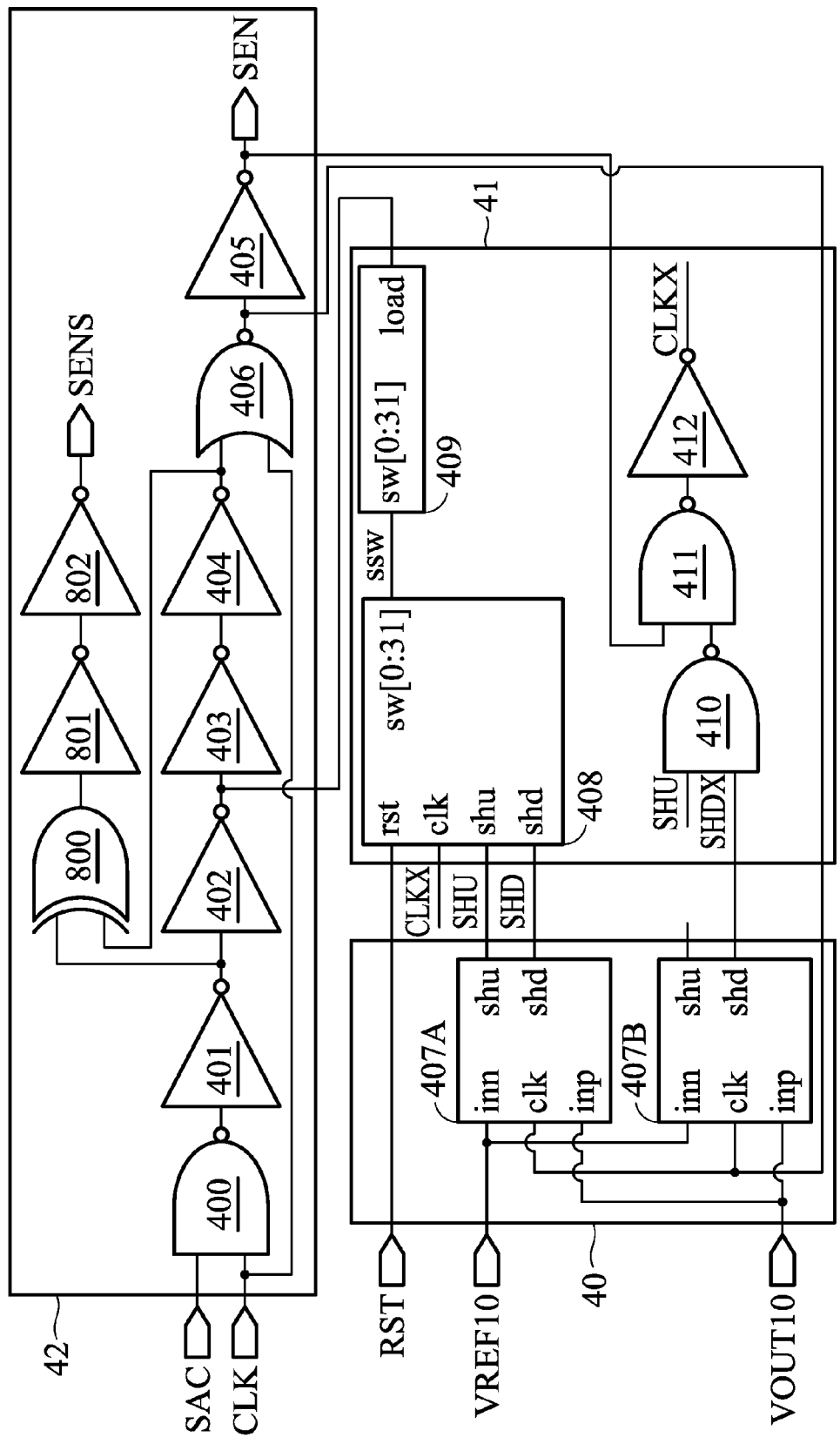
FIG. 8 shows another exemplary embodiment of a timing controller.

In the above embodiment, the timing control circuit 12 generates the enable signal SEN to control the PMOS transistor 300 of the output-stage circuit 10. In the embodiment, the timing control circuit 12 can further generate another enable signal SENS to control the output-stage circuit. As shown in FIG. 8, the pulse generator 42 further comprises an XOR gate 800 and inverters 801 and 802. One input terminal of the XOR gate 800 is coupled to the output terminal of the inverter 401, and the other input terminal is coupled to the output terminal of the inverter 404. The inverters 801 and 802 are coupled in series at the output terminal of the XOR gate 800. Through the logic operations of the XOR 800 and the inverters 801 and 802, the inverter 802 generators the enable signal SENS. The pulse width of the enable signal SENS is modulated through the operations of the logic elements in the pulse generator 42 and the charge time determined by the programmable timing generator 41.

Figure 9:
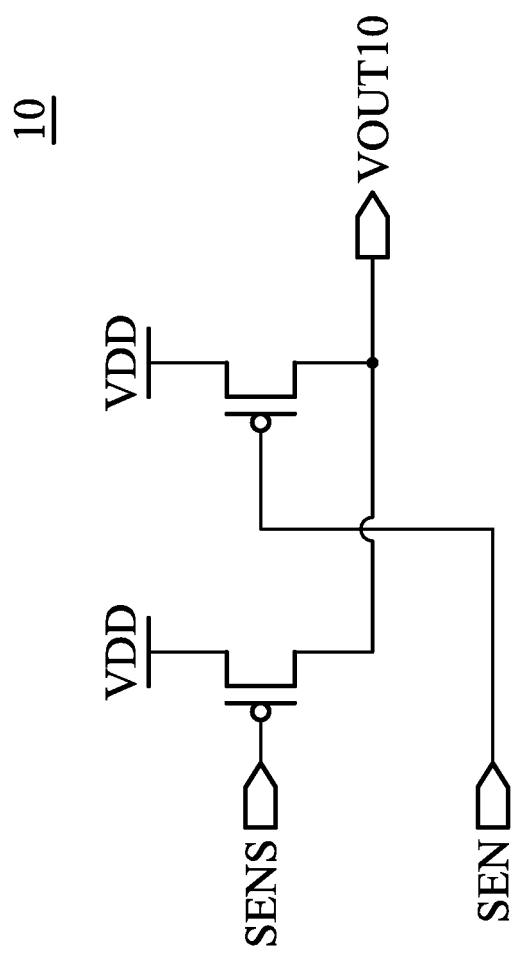
FIG. 9 shows another exemplary embodiment of an output-stage circuit.
Figure 10:
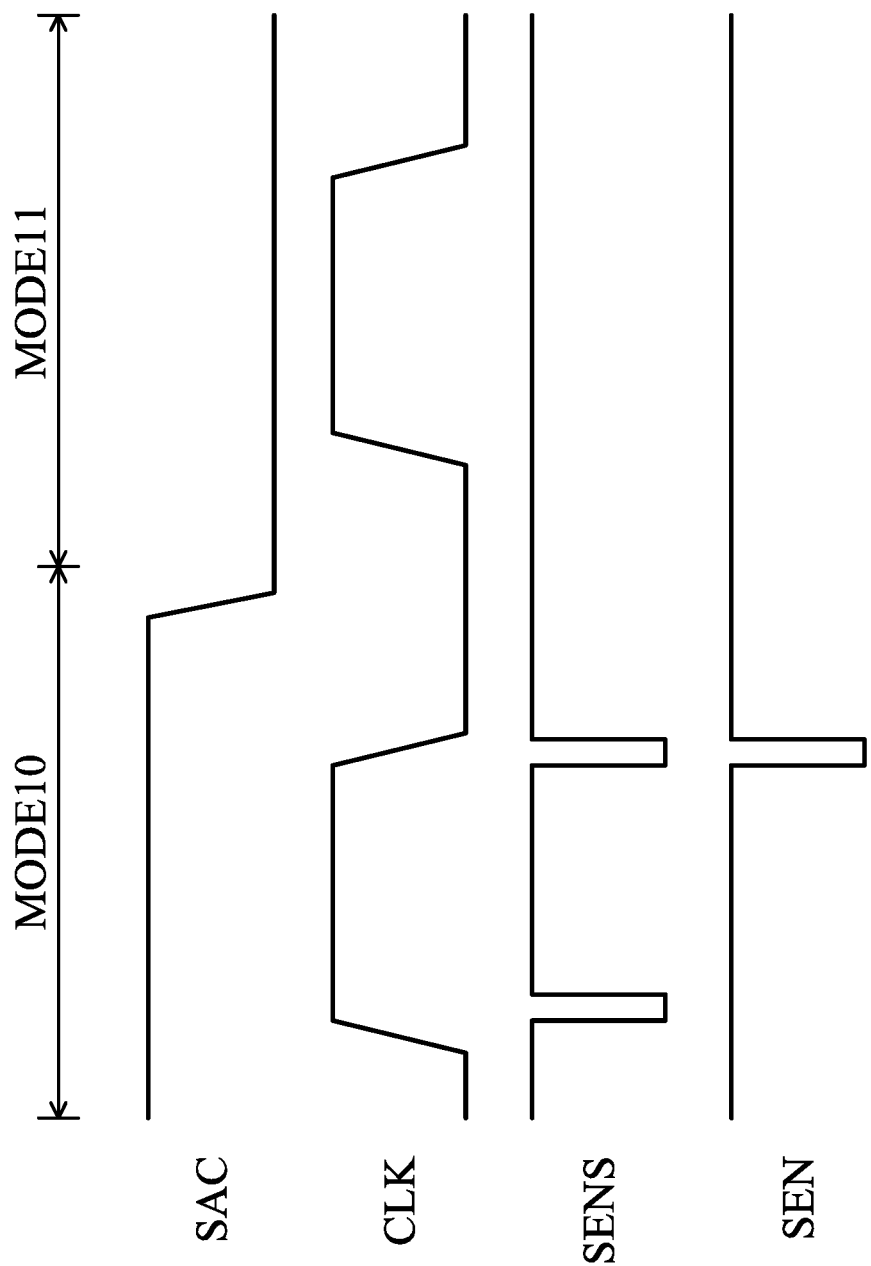
FIG. 10 shows a schematic diagram illustrating the relationship between control signals and voltage at an output node according to another exemplary embodiment.

In the embodiment, the output-stage circuit 10 further comprises a PMOS transistor 900, as shown in FIG. 9. In some embodiments, the size of the PMOS transistor 300 is larger than the size of the PMOS transistor 900. The gate (control terminal) of the PMOS transistor 900 receives the enable signal SENS, the source (input terminal) thereof receives the operation voltage VDD, and the drain (output terminal) thereof is coupled to the output terminal NOUT. Referring to FIG. 10, the pulses of the enable signal SENS occur at the rising edge and the falling edge of the clock signal CLK. When the falling edge of the clock signal CLK is presented, there is a greater voltage drop at the output node NOUT. Thus, when the falling edge of the clock signal CLK is presented, the PMOS transistors 300 and 900 are turned on at the same time by the enable signal SEN and SENS respectively, which enhances the driving capability of the output-stage circuit 10 to decrease the amount of the voltage drop at the output node NOUT. Moreover, when the rising edge of the clock signal CLK is presented, there is a less voltage drop at the output node NOUT. Thus, when the rising edge of the clock signal CLK is presented, only the transistor 300 is turned on by the enable signal SENS.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A low dropout regulator for generating a first output voltage at an output node, comprising:
    an output-stage circuit controlled by a first enable signal when the low dropout regulator operates in an operation mode to generate the first output voltage to the output node;
    a reference-voltage generation circuit controlled by a bias voltage to generate a first reference voltage;
    a timing controller, coupled to the output node, receiving the first reference voltage, wherein when the low dropout regulator operates in the operation mode, the timing controller generates the enable signal and programs the first enable signal according to a voltage at the output voltage and the first reference voltage; and
    an active low dropout circuit generating a second output voltage to the output node when the low dropout regulator operates in a standby mode,
    wherein the timing controller comprises:
        a shift register generating a switch signal and performing a count-up operation according to a first control signal or a count-down operation according to a second control signal; and an adjustable capacitor array determining a charge time according to the switch signal, thereby modulating a pulse width of the first enable signal.

2. The low dropout regulator as claimed in claim 1, wherein the timing controller comprises:

a comparison circuit comparing the first reference voltage with the voltage at the output node and generating the first control signal and the second control signal according to a comparison result of comparing the first reference voltage with the voltage at the output node; and a pulse generator receiving a first clock signal to generate the first enable signal, wherein the adjustable capacitor array determines a number of capacitors which are coupled to the pulse generator to determine the charge time, and the pulse generator modulates the pulse width of the first enable signal according to the charge time.

3. The low dropout regulator as claimed in claim 2, wherein the comparison circuit comprises:

a first comparator receiving the first reference voltage and comparing the first reference voltage with the voltage at the output node and generating the first control signal and the second control signal according to a comparison result of the first comparator; and a second comparator comparing a second reference voltage with the voltage at the output node and generating a third control signal according to a comparison result of the second comparator, wherein when the voltage at the output node is not in a lock range between the first reference voltage and the second reference voltage, the programmable timing generator changes the charge time to modulate the pulse width of the first enable signal.

4. The low dropout regulator as claimed in claim 3, wherein when the voltage at the output node is in the lock range, the programmable timing generator stop changing the charge time to maintain the pulse width of the first enable signal.

5. The low dropout regulator as claimed in claim 3, wherein the first comparator has a first channel width ratio, and the second comparator has a second channel width ratio which is different from the first channel width ratio, and wherein the second comparator receives the first reference voltage and transfers the first reference voltage to the second reference voltage, based on the second channel width ratio, which is compared with the voltage at the output node.

6. The low dropout regulator as claimed in claim 1, wherein the voltage at the output node is in the lock range, the shift register operates a lock operation to stop changing the switch signal to maintain the number of capacitors which are coupled to the pulse generator.

7. The low dropout regulator as claimed in claim 1, wherein the output-stage circuit comprises:

a first transistor having a control terminal receiving the first enable signal, an input terminal receiving an operation voltage, and an output terminal coupled to the output node.

8. The low dropout regulator as claimed in claim 7, wherein when the low dropout regulator operates in the operation mode, the output-stage circuit is further controlled by a second enable signal to generate the first output voltage, and the timing controller programs the second enable signal according to the first reference voltage and the voltage at the output node, and wherein the output-stage circuit further comprises:

a second transistor having a control terminal receiving the second enable signal, an input terminal receiving an operation voltage, and an output terminal coupled to the output node, wherein size of the first transistor is larger than size of the second transistor.

9. The low dropout regulator as claimed in claim 8, wherein the low dropout regulator operates according to a clock signal, wherein the timing controller makes the second enable signal have one pulse in response to a rising edge of the clock signal to turn on the second transistor, and wherein the timing controller makes each of the first enable signal and the second enable signal have one pulse in response to a falling edge of the clock signal to turn on the first transistor and the second transistor respectively.

10. The low dropout regulator as claimed in claim 1, wherein the reference-voltage generation circuit is a sub-threshold reference-voltage generator.

11. The low dropout regulator as claimed in claim 1, wherein when the low dropout regulator operates in the standby mode, the output-stage circuit stops generating the first output voltage to the output node.

12. The low dropout regulator as claimed in claim 1, wherein the active low dropout circuit comprises a plurality of transistors, and the active low dropout is controlled by the bias voltage to generate the second output voltage when the low dropout regulator operates in the standby mode.

* * * * *